(12) United States Patent
Hitomi

(10) Patent No.: US 7,147,957 B1
(45) Date of Patent: *Dec. 12, 2006

(54) ELECTRODE FOR FUEL CELL AND MANUFACTURING METHOD THEREFOR

(75) Inventor: Shuji Hitomi, Kyoto (JP)

(73) Assignee: GS Yuasa Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/497,515

(22) Filed: Feb. 4, 2000

(30) Foreign Application Priority Data

| Feb. 5, 1999 | (JP) | ................................ 11-029045 |
| Mar. 24, 1999 | (JP) | ................................ 11-078885 |
| Mar. 24, 1999 | (JP) | ................................ 11-078889 |

(51) Int. Cl.
*H01M 4/86* (2006.01)
*H01M 4/90* (2006.01)
*H01M 4/96* (2006.01)

(52) U.S. Cl. ............................ 429/40; 429/41; 429/42
(58) Field of Classification Search .................. 429/30, 429/40, 41, 42
See application file for complete search history.

(56) References Cited

U.S. PATENT DOCUMENTS

| 4,110,392 | A | * | 8/1978 | Yamazaki | .................... 264/127 |
| 4,524,114 | A | * | 6/1985 | Samuels et al. | ............... 429/42 |
| 4,876,115 | A | * | 10/1989 | Raistrick | ..................... 427/115 |
| 5,346,780 | A | | 9/1994 | Suzuki | |
| 5,620,807 | A | * | 4/1997 | Mussell et al. | ................ 429/33 |
| 5,723,173 | A | * | 3/1998 | Fukuoka et al. | ............. 427/115 |
| 5,783,325 | A | * | 7/1998 | Cabasso et al. | ............... 429/42 |
| 6,187,467 | B1 | | 2/2001 | Zhang et al. | |
| 6,344,291 | B1 | * | 2/2002 | Hitomi | ........................ 429/42 |
| 6,391,487 | B1 | | 5/2002 | Totsuka | |

OTHER PUBLICATIONS

V.A. Paganin, E.A. Ticianelli, E.R. Gonzales, Development and Electrochemical Studies of Gas Diffusion Electrodes for Polymer Electrolyte Fuel Cells, *Journal of Applied Electro-Chemistry 26* (1996), pp. 297-304, (Institute de Quimica de São Carlos-USP, Caixa Postal 780, São Carlos, Spain, CEP 13560-970, Brazil.), 0021-891X, © 1996, Chapman & Hall.

* cited by examiner

*Primary Examiner*—Patrick Joseph Ryan
*Assistant Examiner*—Julian Mercado
(74) *Attorney, Agent, or Firm*—Sughrue Mion, PLLC

(57) ABSTRACT

In an electrode for a fuel cell, a catalyst layer contains a solid polymer electrolyte, catalyst particles and porous polymer. The porous polymer is provided for the inside portions of pores of said catalyst layer and/or the surface of said catalyst layer.

34 Claims, 5 Drawing Sheets

ELECTRODE FOR FUEL CELL AND MANUFACTURING METHOD THEREFOR

BACKGROUND OF THE INVENTION

1. Field of the Invention

The present invention relates to an electrode for a fuel cell and a manufacturing method therefor.

2. Description of the Related Art

A solid polymer electrolyte fuel cell is an apparatus comprising membrane-electrode assembly, which comprises electrodes, an anode and a cathode each having a catalyst layer and a gas diffusion layer containing an electron-conductive porous substrate, bonded onto ion-exchange membrane. Hydrogen is supplied to the anode and oxygen is supplied to the cathode so as to generate electric power by using electrochemical reactions. The electro-chemical reaction which occurs in each electrode is as follows:

Anode: $H_2 \rightarrow 2H^+ + 2e$
Cathode: $1/2 O_2 + 2H^+ + 2e \rightarrow H_2O$
Overall Reaction: $H_2 + 1/2 O_2 \rightarrow H_2O$ As can be understood from the reaction formula, reactions in each electrode proceed in only the three-phase boundary sites in which supply and receipt of reactant gases (hydrogen or oxygen), protons ($H^+$) and electrons (e) can simultaneously be performed.

As shown in FIG. 8, the electrode of a fuel cell incorporates a porous catalyst layer 86 in which catalyst particles 81 and solid polymer electrolyte 82 are distributed three-dimensionally with a plurality of small pores 84 are formed; and a gas diffusion layer 88 containing a electro-conductive porous substrate 87.

The gas diffusion layer 88 provides spaces in the surface of the catalyst layer 86 to maintain a passage for carrying oxygen or hydrogen as a reactant supplied from the outside of the cell. Moreover, the gas diffusion layer 88 provides a passage for discharging water produced in the catalyst layer of the anode from the surface of the catalyst layer 86 to the outside of the cell system.

On the other hand, the catalyst particles 81 of the catalyst layer 86 form electron conductive channel, the solid polymer electrolyte 82 forms a proton conductive channel and the small pores 84 form supply/discharge channel for supplying oxygen or hydrogen to the inside from the surface of the catalyst layer 86 and discharging water produced in the cathode to the surface from the inside of the catalyst layer. The three channels are three-dimensionally dispersed in the catalyst layer 86 so that an infinite number of three-phase boundary sites, in which the gas, protons ($H^+$) and electrons (e) are supplied and receipted simultaneously, are formed in the catalyst layer 86. Thus, portions for the reaction sites of the electrode is provided.

Note that reference numeral 83 shown in FIG. 8 represents PTFE (polytetrafluoroethylene) particles which impart hydrophobicity to the inside portion of the small pores 84 of the catalyst layer 86 and the surface of the small pores 84. Reference numeral 85 represents an ion-exchange membrane.

The ion-exchange membrane 85 serving as an electrolyte exhibits satisfactory proton conductivity in a water-retention state. Therefore, the operation must be performed while a wet state is being maintained in the cell. Therefore, humidified hydrogen or oxygen are supplied to the anode or the cathode to prevent dry up of the ion-exchange membrane 85 so that water content in the ion-exchange membrane is controlled.

The solid polymer electrolyte fuel cell has the catalyst layer with the pores forming three-dimensional channel for supplying oxygen or hydrogen. Therefore, the humidified supply gas, which is the reactant, causes water to be accumulated in the surface of the catalyst layer. As an alternative to this, accumulation of water in the pores inhibits supply of the reactant gases to the three-phase boundary sites of the catalyst layer, and, in particular, to the deep portion of the electrode. Thus, an actual active surface area is reduced. Therefore, the performance of the cell cannot satisfactorily be obtained. Accordingly, adequate hydrophobicity is imparted to the gas diffusion layer containing the electro-conductive porous substrate and the catalyst layer to prevent accumulation of water.

Importance of hydrophobicity to the electro-conductive porous substrate in a case of carbon paper (having a thickness of 1.5 mm) which is made by a sintering body of carbon fibers will now be described. The carbon paper is immersed in solution of PTFE suspension. Then, the carbon paper containing the PTFE particles are baked at about 350° C. for 15 minutes in a nitrogen atmosphere so that the surfaces of the carbon fibers are coated with PTFE.

On the other hand, the hydrophobicity is imparted to the catalyst layer by mixing the PTFE suspension into paste for the catalyst layer including carbon particles supporting fine particles of noble metal as catalyst, such as platinum, and the solid polymer electrolyte solution.

The hydrophobicity of both of the catalyst layer and the electro-conductive porous substrate is, however, unsatisfactory at present. Supply of hot and enough humidified gases to improve the proton conductivity of the ion-exchange membrane resulting in enhancement of cell power unsatisfactorily causes water to be water flooding accumulated in the pores of the catalyst layer and the surface of the same. As a result, supply of the reactant gases to the three-phase boundary sites of the catalyst layer, and, in particular, to deep portions of the catalyst layer is inhibited. As a result, the actual active surface area is reduced, causing a problem to arise in that the performance of the cell cannot sufficiently be obtained. In particular, because water is produced with the reactions proceeding, this accumulation of water is occurred easily in the pores of the catalyst layer in the cathode.

To improve the hydrophobicity of the catalyst layer, resulting in solution of the foregoing problem, the mixture ratio of the solution of PTFE particles dispersion to the past for the catalyst layer must be increased. However, the increase of the amount of the PTFE particles in the electrode reduces the ratio of the catalyst supporting on carbon, the solid polymer electrolyte and the pores. As a result, formation of the electron conductive channel, the proton conductive channel and the channel for supplying/discharging oxygen or hydrogen as a reactant and water which is a product is inhibited. Therefore, there arises a problem in that the power of the cell is undesirably reduced.

To furthermore improve the hydrophobicity of the electro-conductive porous substrate, the amount of PTFE suspension which is applied to the electro-conductive porous substrate must be increased. If the amount of it is enlarged excessively, PTFE particles close pores of the electro-conductive porous substrate. In the foregoing case, there arises a problem in that gas supply is inhibited.

In general, it is said that the effective thickness of the catalyst layer for the electrochemical reactions is 5 μm to 10 μm. The gas supply in the electrode cannot sufficiently be performed in the catalyst layer having a larger thickness. As a result, the gas is wasted and the function of the electro-conductive porous substrate for maintaining the passage for the gas is inhibited. Therefore, control of the thickness of the catalyst layer is an important factor to improve the performance of the electrode.

However, in general, carbon paper which is the conventional electro-conductive porous substance is manufactured by molding carbon fibers each having a diameter of 5 µm to 10 µm into an unwoven shape, followed by sintering. The average diameter of the pores of the substrate is about 10 µm to about 20 µm. Therefore, it is very difficult to keep the thickness of 5 µm to 10 µm of the catalyst layer. A cross section of a state where the conventional catalyst layer has been formed on the carbon paper gas diffusion layer is shown in FIG. 9. Reference numeral 91 represents the catalyst layer and 92 represents the carbon paper as the electro-conductive porous substance. Since the diameter of the pores in the electrochemical reactions made of the porous material is large and its pores are roughly distributed, the thickness of the applied catalyst layer 91 is ununiform.

To prevent the foregoing problem, the porosity and its pore diameter of the porous substance must be reduced and a dense structure must be formed. In the foregoing case, the passage for the gas cannot easily be maintained.

SUMMARY OF THE INVENTION

In view of the foregoing, an object of the present invention is to advance the performance of an electrode for a fuel cell by improving the hydrophobicity while a gas diffusivity of the gas diffusion electrode for a fuel cell is being maintained. Another object of the present invention is to improve the performance of an electrode for a fuel cell by densely forming a electro-conductive porous substrate to uniform the thicknesses of the catalyst layer while a gas diffusivity of the gas diffusion layer is being maintained.

According to the present invention, an electrode for a fuel cell comprises a catalyst layer containing a solid polymer electrolyte, catalyst particles and porous polymer (a) alternatively, an electrode for a fuel cell comprises a catalyst layer containing a solid polymer electrolyte and catalyst particles, wherein porous polymer is provided for the inside portions of pores of the catalyst layer or/and the surface of the catalyst layer. An electrode for a fuel cell comprises a catalyst layer containing a solid polymer electrolyte and catalyst particles; and a gas diffusion layer containing electro-conductive porous substrate, wherein the catalyst layer or/and electro-conductive porous substrate incorporate porous polymer. It is preferable that the porous polymer is fluorocarbon polymer.

DETAILED DESCRIPTION OF THE DRAWINGS

The present invention will be described as follows referring to the accompanying drawings.

Figure 4:
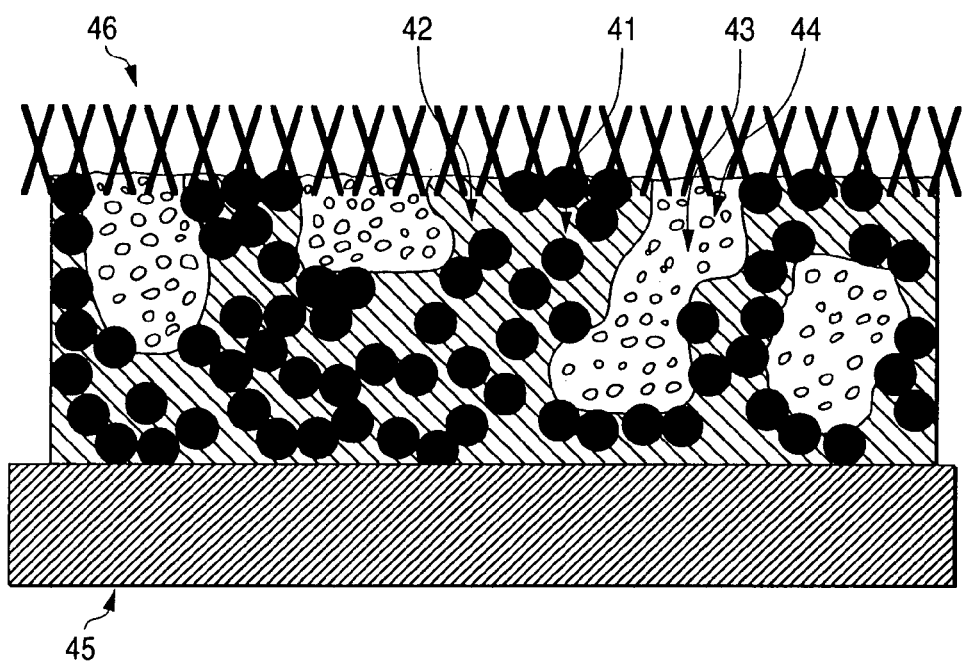
FIG. 4 is a schematic view showing the structure of an electrode for a fuel cell according to the present invention.
Figure 5:
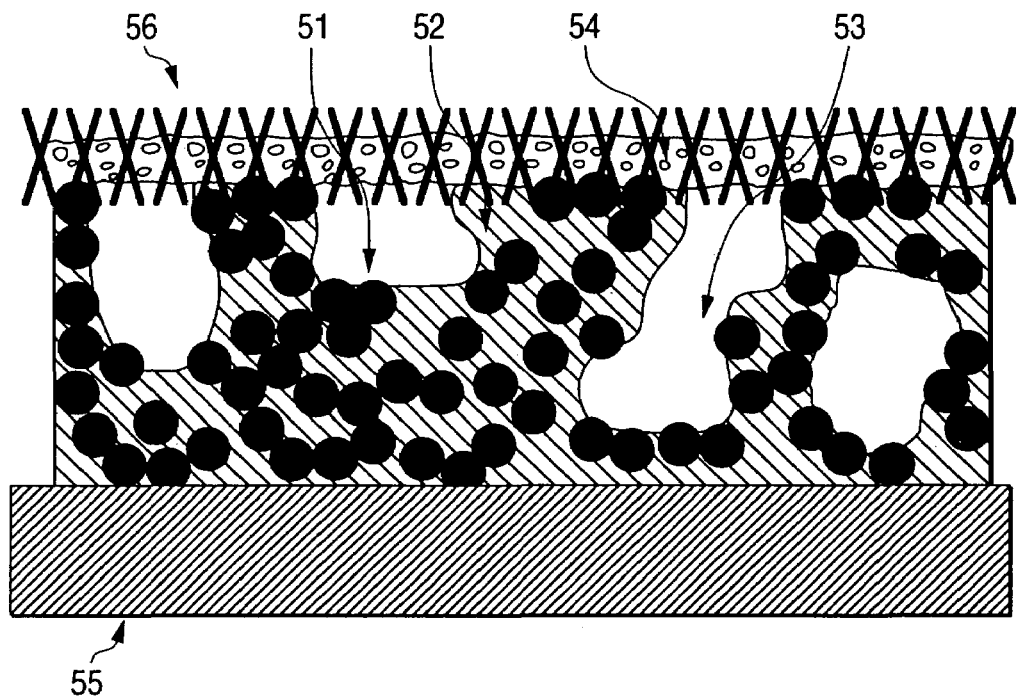
FIG. 5 is a schematic view showing the structure of the electrode for a fuel cell according to the present invention.
Figure 6:
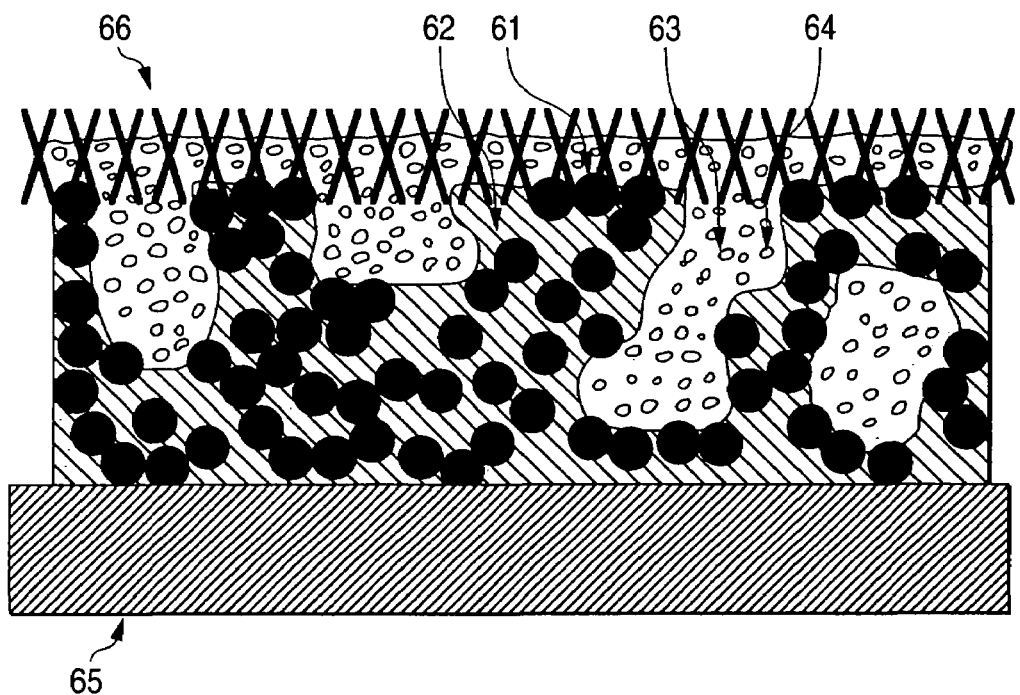
FIG. 6 is a schematic view showing the structure of the electrode for a fuel cell according to the present invention.

An example of the structure of an electrode for a fuel cell according to the present invention will now be described to furthermore specifically describe the present invention. FIGS. 4, 5 and 6 are schematic views showing examples of structures of the electrode for a fuel cell according to the present invention.

As shown in FIGS. 4, 5 and 6, a catalyst layer according to the present invention comprises a solid polymer electrolyte and catalyst particles and plural pores. The catalyst layer has a structure that catalyst particles 41, 51 and 61 and solid polymer electrolytes 42, 52 and 62 are distributed three-dimensionally with a plurality of small pores 43, 53 and 63 in the catalyst layer. The average diameter of the small pore is from 10 nm to 1 µm. Basically, the catalyst particles form an electron conductive channel and the pores for a channel for supplying and discharging oxygen or hydrogen and water which is a product.

In the case of the electrode for a fuel cell shown in FIG. 4, porous polymer 44 with three-dimensional network pore (hereinafter referred to as "porous polymer") exist mainly at the small pores in the catalyst layer. The electrode for a fuel cell shown in FIG. 5 includes porous polymer 54 with three-dimensional network pore at the surface of the catalyst layer. An electrode for a fuel cell shown in FIG. 6 includes porous polymer 64 with three-dimensional network pore existing at both the small pores and the surface of the catalyst layer. If necessary, each of the foregoing electrodes for fuel cells are able to include the catalyst layer and the gas diffusion layer with the electro-conductive porous substrate with the porous polymer at same time. Referring to the figures above, reference numerals 45, 55 and 65 represent ion-exchange membranes and each of 46, 56 and 66 represents a carbon porous material made by sintering of carbon fibers as an electro-conductive substrate. If necessary, PTFE particles may be provided into the catalyst layer similarly to the conventional technique.

According to the present invention, it is not necessary that the porous polymer having ion-exchange function is provided for the small pores in the catalyst layer or/and the surface of its layer. Therefore, the hydrophobicity of the small pores or/and the surface of the catalyst layer can be improved. As a result, accumulation of water in the surface of the catalyst layer causing the small pores to be closed can be prevented. Also accumulation of water in the small pores can be prevented. Therefore, the gases, which is reactants, can smoothly be supplied to the three-phase boundary sites of the catalyst layer. Hence it follows that the catalyst layer can satisfactorily be activated.

Although the effect of the present invention can be obtained when the porous polymer is provided for only the inside portions of the pores as shown in FIG. 4 or when the porous polymer is provided for only the surface as shown in FIG. 5, a furthermore satisfactory activation can be realized when the porous polymer is provided for both of the inside of the small pores and the surface of the catalyst layer as shown in FIG. 6.

Although the porous polymer may be provided for the overall inside of the small pores or/and surface of the matrix of the catalyst layer as shown in the foregoing drawings, the porous polymer may be provided for a portion of the surface or/and a portion of the inside of the small pores.

Figure 7:
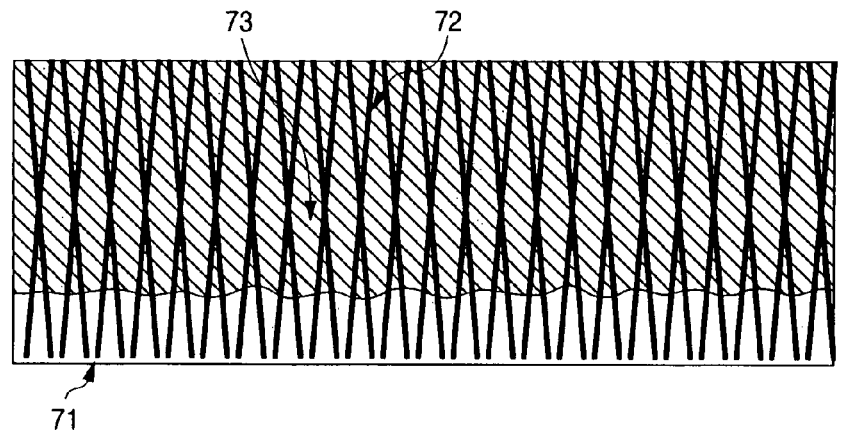
FIG. 7 is a schematic view showing the structure of the electrode for a fuel cell according to the present invention.
Figure 8:
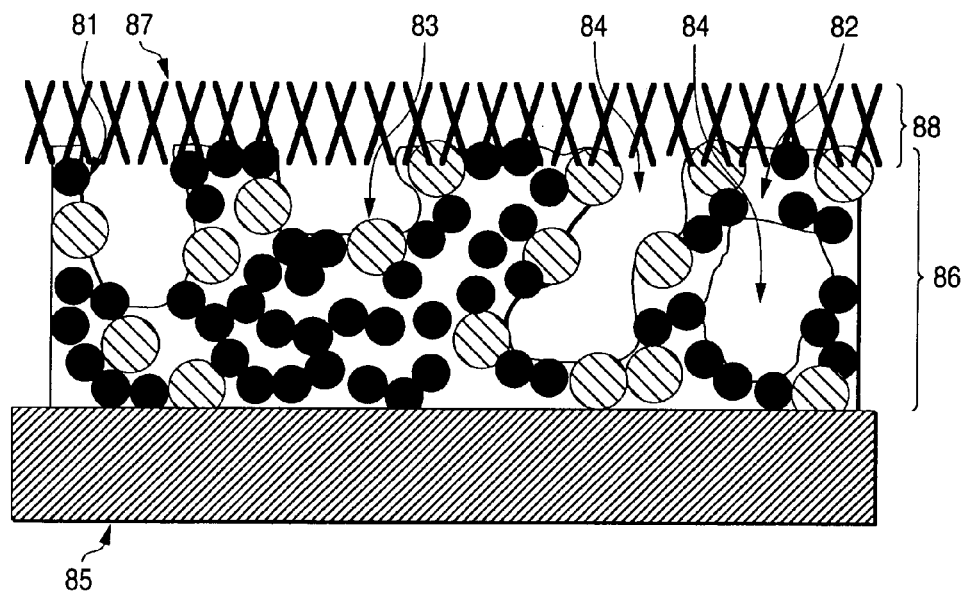
FIG. 8 is a schematic view showing the structure of a conventional electrode for a fuel cell.
Figure 9:
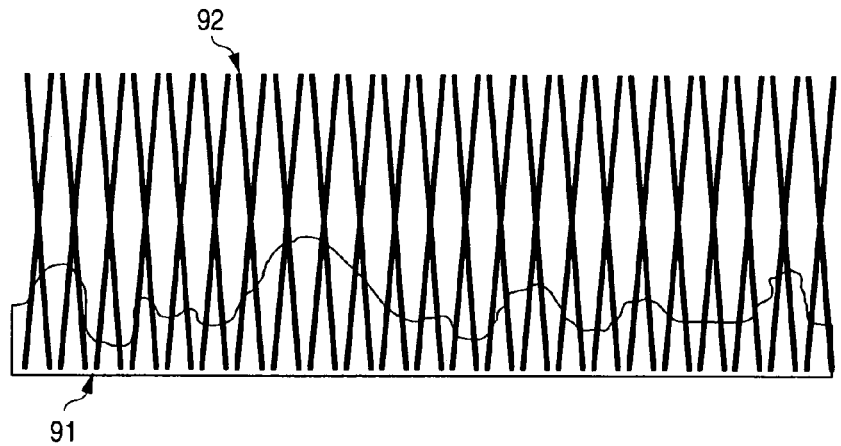
FIG. 9 is a schematic view showing the cross-sectional structure of a conductive base of the conventional electrode for a fuel cell.

FIG. 7 is a schematic view showing the structure of an electrode for a fuel cell according to the present invention, which comprises a catalyst layer, containing a solid polymer electrolyte and catalyst particles, and a gas diffusion layer, containing the electro-conductive porous substrate, the structure being characterized in that the electro-conductive porous substrate includes the porous polymer. Referring to FIG. 7, reference numeral 71 represents a catalyst layer of the electrode, 72 represents the electro-conductive porous substrate such as carbon paper or carbon cloth and 73 represents the porous polymer. Since the electro-conductive porous material according to the present invention includes the porous polymer in the pores thereof, a dense structure can be formed. Therefore, the thicknesses of the catalyst layer of the electrode can substantially be uniformed.

A preferred material for forming the catalyst particles for use as the electrode according to the present invention is any one of platinum metal particle, such as platinum, rhodium, ruthenium, iridium, palladium or osmium, their alloy particles or the foregoing catalyst supported on carbon particle. The solid polymer electrolyte is a solid polymer electrolyte having proton conductivity. It is preferable that the solid polymer electrolyte is constituted by ion-exchange resin. It is preferable that sulfon type ion-exchange resin is employed which is made of perfluorosulfonic acid or polystyrene sulfonic acid type. Although the porous substrate according to the present invention may be made of foam nickel or sintered body of titanium fibers, it is preferable that a carbon material which is a sintered body of carbon fibers or the like, such as carbonpaper or carbon cloth, is employed from a viewpoint of obtaining satisfactory electro-conductivity.

The polymer according to the present invention is polymer which does not always has no proton conductivity and exemplified by polyvinyl chloride, polyacrylonitrile, polyethylene oxide or polypropylene oxide, oplyacrylonitrile, poly vinylidene fluoride, polyvinylidene chloride, polymethyl methacrylate, polymethyl acrylate, polyvinyl alchol, polymethacrylonitrile, polyvinyl acetate, polyvinyl pyrolidone, polyethylene-imine, polybutadiene, oplystyrene, polyisopreneor their derivatives. The foregoing materials may be empoloyed solely or their mixtures may be employed. Resin prepared by copolymerizing a variety of monomers which constitute the foregoing polymer may be employed. It is preferable that fluoro carbon polymer exhibiting excellent hydrophobicity is employed, such as polychloro-trifluoroethylene (PCTFE), polyvinylidene fluoride (PVDF) or polyvinyl fluoride (PVF); or copolymer containing fluorocarbon polymer, such as ethylene-tetrafluoro ethylene copolymer (ETFE) or ethylene tetrafluoride-propylene hexafluoride copolymer (EPE) or vinylidene fluoride-hexafluropropylene copolymer (P (VdF-HFP)). Note that their mixtures maybe empoloyed.

Figure 10:
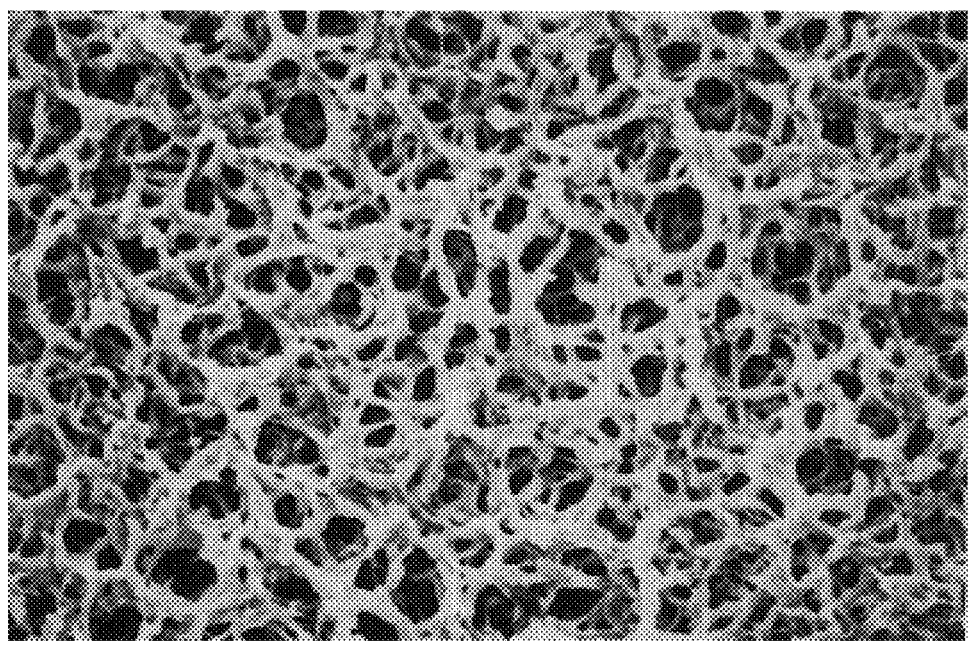
FIG. 10 is a schematic view showing the cross-sectional structure of porous polymer according to the present invention.

To realize smooth supply and discharge of the reactant gases, it is preferable that the small pores in the porous polymer are continuous three-dimensionally network structure such as shown in FIG. 10. As for the diameter of each pore, it is preferable that the average diameter of the pores is 1 μm or smaller, more preferably 0.5 μm or smaller, preferably 100 nm or larger. Because average diameter of pores in electro-conductive substrate is about 10 μm to 20 μm. Furthermore, it is preferable that the average diameter of poresis in porous polymer is 0.05 μm or smaller, because average diameter of pores in catalyst layer is about 1 μm to 2 μm. It is preferable that the porosity of the porous polymer is not lower than 45% nor higher than 95% from a viewpoint of realizing smooth supply of gases and smooth discharge of water.

The porous polymer according to the present invention is manufactured by phase-inversion process in which polymer (a) from solution (c) in which the polymer (a) is dissolved with lowering in solvent (b).

For example, the phase inversion occurs, by a method using change in the solubility of polymer (a) with lowering the temperature of the solution (c) in a case of combination of the polymer (a) and the solvent (b) such that the polymer (a) cannot easily be dissolved in the solvent (b) at low temperature and the polymer (a) can be dissolved when the temperature has been raised will now be described. The phase inversion is a phenomenon that the polymer (a) with respect to the solvent (b) becomes saturated when the polymer (a) has completely been dissolved in the solvent (b) by raising the temperature followed by lowering the temperature of the solution (c) so that the polymer (a) and the solvent (b) are separated from each other with decreasing the solubility. Therefore, the porous polymer can be obtained.

As an alternative to this, the phase inversion occurs by a method using change in the concentration caused by vaporizing the solvent (b). Process is as follows. The polymer (a) is dissolved in a mixture containing a solvent (b) and non solvent (e). The non solvent (e) is less volatile than solvent (b), and the solvent (b) and the non solvent (e) must be miscible liquid. During the evaporation, the relative ratio of non solvent (e) increases leading to the polymer (a) precipitation. Therefore, porous polymer can be obtained.

It is preferable that the phase inversion by a solvent extraction method is employed as a method of manufacturing the porous polymer with which dense and continuous three-dimensional network pores can be obtained. That is, non solvent (d) which is insoluble in the polymer (a) and soluble in the solvent (b), extract the solvent (b) from the solution (c) in which the polymer (a) has been dissolved by contact between solution (c) and non solvent (d). Thus, the porous polymer is obtained.

The polymer (a) according to the present invention is polymer which does not always have no proton conductivity and exemplified by polyvinyl chloride, polyacrylonitrile, polyethylene oxide or polypropyleneoxide, polyacrylonitrile, poly vinylidene fluoride, polyvinylidene chloride, polymethyl methacrylate, polymethyl acrylate, polyvinyl alcohol, polymethacrylonitrile, polyvinyl acetate, polyvinyl pyrrolidone, polyethylene-imine, polybutadiene, polystyrene, polyisoprene or their derivatives. The foregoing materials may be employed solely or their mixtures may be employed. Polymer prepared by copolymerizing a variety of monomers which constitute the foregoing polymer may be employed. It is preferable that fluorocarbon polymer exhibiting excellent hydrophobicity is employed, such as polychloro-trifluoroethylene (PCTFE), polyvinylidene fluoride (PVdF) or polyvinyl flouoride (PVF); or copolymer containing fluorocarbon polymer, such as ethylene-tetrafluoro ethyelne copolymer (ETFE) ethylene tetrafluoride-propylene hexafluoride copolymer (EPE), or P(VdF) copolymer. Note that their mixtures may be employed.

The polymer (a) for use in a method of phase-inversion processed by change in the solubility, the polymer (a) from the solution (c) in which the polymer (a) has been dissolved in the solvent (b) is preferably polyvinylidene fluoride (PVdF), P(VdF) copolymer, such as vinylidene fluoride/hexafluoropropylene copolymer (P(VdF-HFP).

The solvent (b) for dissolving the polymer (a) is exemplified by ketone, such as methyl ethyl ketone (MEK) or acetone; ester, such as propylene carbonate, ethylene carbonate, dimethyl carbonate, diethyl carbonate or ethylmethyl carbonate; ether such as dimethyl ether; diethyl ether; ethylmethyl ether; tetrahydrofuran; dimethylformamide; N-methylpyrrolidone (NMP). In particular, ketone is a preferred material. Among the ketone, it is preferable that methyl ethyl ketone (MEK) is employed.

When the porous fluorocaron polymer is prepared as a polymer (a) by the phase inversion process using the above-mentioned solvent extraction method, dense and uniform pores can be formed. Therefore, it is preferable that the polymer (a) is polyvinylidene fluoride (PVdF), and P(VdF) copolymer, such as vinylidene fluoride/hexafluoropropylene copolymer (P(VdF-HFP) or vinylidene fluoride-ethylene tetrafluoride (P(VdF-TFP). In particular, it is preferable for polymer (a) that polyvinylidene fluoride (PVdF) exhibiting excellent hydrophobicity or vinylidene fluoride/hexafluoropropylene copolymer (P (VdF-HFP) which is a soft material which permits easy handling is employed.

The solvent (b) for dissolving the polymer (a) is required to dissolve the polymer (a). The material is exemplified by ester, such as propylene carbonate, ethylene carbonate, dimethyl carbonate, diethyl carbonate or ethylmethyl carbonate; ether, such as dimethyl ether, diethyl ether, ethylmethyl ether or tetrahydrofuran (THF); ketone, such as methylethyl ketone or acetone; dimethylformamide; dimethyl acetoamide; 1-methyl-pyrollidone; and N-methylpyrrolidon (NMP).

It is preferable that the extracting non solvent (d) is water or mixed solution of both water and alcohol because of cheeper.

When the foregoing materials are employed in the solvent extraction method, it is preferable that polymer (a) is polyvinylidene fluoride (PVdF) or P (VdF-HFP), and solvent (b) is in N-methylpyrrolidone (NMP), and non solvent (d) is water or the mixed solution of water and alcohol from a viewpoint of obtaining excellent hydrophobicity and uniform diameters of the pores.

A method of manufacturing the electrode for a fuel cell according to the present invention and structured as described above will now be described. Paste for the catalyst layer comprising catalyst supported on carbon particles, the solid polymer electrolyte solution and, if necessary, PTFE suspension is applied onto a polymer film to form a film of the paste (in general, having a thickness of 3 μm to 30 μm). Then, heating and drying are performed so that the conventional catalyst layer can be obtained. As an alternative to this, paste of the catalyst layer comprising catalyst supported on carbon particles (noble metal particles, such as platinum are highly dispersedly loaded on carbon particle) and, if necessary, PTFE suspension is applied onto the polymer film to form a film of the paste (in general, having a thickness of 3 μm to 30 μm). Then, heating and drying are performed. Then, the solid electrolyte solution is applied and allowed to be impregnated from a position above the film of the paste. Thus, the conventional catalyst layer can be obtained. If necessary, these above-mentioned conventional catalyst layers are joined to the ion-exchange membrane. After that, if necessary, the gas diffusion layer including electro-conductive porous substrate is joined to the surface of the catalyst layer. Then, the solution (c) in which the polymer (a) is dissolved in the solvent (b) is contained in the above-mentioned conventional catalyst layer. Then, the polymer (a) is separated from the solution (c) by phase inversion process so that the catalyst layer, including porous polymer for a fuel cell's electrode is obtained. For example, catalyst layer including the solution (c) is immersed into the non solvent (d) which is insoluble in polymer (a) and soluble in the solvent (b). Thus, the catalyst layer for a fuel cell's electrode can be obtained. Then, the polymer (a) is phase-separated from the solution (c) so that the electrode for a fuel cell is obtained by solvent extraction method. As an alternative to this, the solution (c) in which the polymer (a) is dissolved in the solvent (b) is contained by coating or immersion. Then, the non solvent (d) which is insoluble in polymer (a) and soluble in the solvent (b) is substituted for the polymer (a). Thus, the electrode for a fuel cell can be obtained by solvent extraction method.

These above-mentioned catalyst layers are adopted as an electrode. Before that, if necessary, those are joined to the gas diffusion layers containing electro-conductive porous substrate.

As an alternative to this, the solution (c) in which the polymer (a) is dissolved in the solvent (b) is contained by coating or immersion. Then, the non solvent (d) which is insoluble in polymer (a) and soluble in the solvent (b) is substituted for the polymer (a). Thus, the electrode for a fuel cell can be obtained.

As an alternative to this, paste of the catalyst layer comprising catalyst supported on carbon particles, the solid polymer electrolyte solution and, if necessary, PTFE suspension is applied onto an electro-conductive porous substrate to form a film of the paste (in general, having a thickness of 3 μm to 30 μm). Then, heating and drying are performed so that the conventional electrode is manufactured. As an alternative to this, paste of the catalyst layer comprising catalyst supported on carbon particles (noble metal particles, such as platinum, are highly dispersedly loaded on carbon particle) and, if necessary, PTFE suspension is applied onto electrdo-conductive porous substrate to form a film of the past (in general, having a thickness of 3 μm to 30 μm). Then, heating and drying are performed. Then, the solid polymer electrolyte solution is applied and allowed to impregnate so that the conventional electrode is manufactured. If necessary, these above-mentioned conventional electrode are joined to the ion-exchange membrane.

Then, the solution (c) in which the polymer (a) is dissolved in the solvent (b) is contained in the above-mentioned conventional electrode. Then, the polymer (a) is separated from the solution (c) by phase inversion process. Thus, the electrode including porous polymer for a fuel cell can be obtained. For example, the above-mentioned electrode including solvent (c) is immersed into the non solvent (d) which is insoluble in the polymer (a) and soluble in the solvent (b) so that the electrode according to the present invention for a fuel cell is manufactured.

When the latter manufacturing method is employed, the electrode for a fuel cell, comprising the catalyst layer containing the solid polymer electrolyte and the catalyst particles and the gas diffusion electrode containing the electro-conductive porous s substrate, has the structure that both the catalyst layer and the electro-conductive porous substrate contain the porous polymer. Therefore, an electrode for a fuel cell exhibiting high activity can be manufactured. When fluorocarbon polymer exhibiting excellent hydrophobicity is employed, a necessity for previously imparting the hydrophobicity to the electro-conductive porous substrate can be eliminated. Because in the foregoing case, the porous polymer provided for the electro-conductive porous substrate acts as a hydrophobic material.

A method of manufacturing the electrode for fuel cell according to the present invention, which has porous polymer in the electro-conductive porous substrate of the gas diffusion layer, will be described.

The solution (c), in which the polymer (a) is dissolved in the solvent (b), is contained in the electro-conductive porous substrate. Then, the polymer (a) is separated from the solution (c) using the phase inversion process by change in the solubility on change in the concentration as described above.

As an alternative to this, the solution (c), in which the polymer (a) is dissolved in the solvent (b), is contained to electro-conductive substrate. Then, the electro-conductive porous substrate containing solution (c) is immersed into non solvent (d), which is insoluble in the polymer (a) and soluble in the solvent (b). Thus, the electro-conductive substrate including the porous polymer is obtained.

Then, a method is employed with which paste of the catalyst layer including catalyst supported on carbon particles, the solid polymer electrolyte solution and, if necessary PTFE (polytetrafluoroethylene) suspension is applied on the electro-conductive porous substrate by a brush or by spraying is employed. As an alternative to this, a film of the paste of catalyst layer is directly formed on the surface of the electro-conductive porous substrate by a screen printing method or a doctor blade method. As an alternative to this, a method may be employed with which a catalyst layer formed on a polymer film or metallic foil as a blank is transferred to the electro-conductive porous substrate by a hot press method or the like and then the blank is removed away. As an alternative to this, a method may be employed with which the catalyst layer is joined to the surface of the ion-exchange membrane by the foregoing method or the like. Then, the electro-conductive porous substrate including the porous polymer provided for the surface of catalyst layer thereof is hot-pressed or pressed.

If the method of manufacturing an electrode of the present invention for a fuel cell is used which is characterized in that when the porous polymer contains fluorocarbon polymer, furthermore excellent hydrophobicity can be obtained by fluorination of the fluorocarbon polymer ("fluorination of the fluorocarbon polymer" is substitution of a fluorine atom for another atom for example, a hydrogen atom or a chlorine atom)carbon polymer. Fluorocarbon polymer includes polytetrafluoroethylene (PTFE) or tetrafluoroethylene-hexafluoropropylene copolymer (EPE) which consists of only both carbon atoms and fluorine atoms. Since the foregoing material cannot furthermore be fluorinated, the foregoing materials are omitted from the scope of the present invention. It is preferable the fluorocarbon polymer that is polymer containing such as polychlorotrifluoro ethylene (PCTFE), polyvinylidene fluoride (PVdF) or polyvinylidene fluoride (PVF), vinylidne fluoride/hexafluoropropylene copolymer P(VdF/HFP), ethylene-tetrafluoroethylene copolymer (ETFE) or ethylene-chlorotrifluoroethylene copolymer (ECTFE). Their mixtures may be employed.

The process for fluorination of the porous fluorocarbon polymer is performed by substitution fluorine (F) for another atom, such as hydrogen (H) or chlorine (Cl), joined to carbon skeletons of the fluorocarbon polymer. For example, when the porous fluorocarbon polymer is exposed to fluorine gas, the foregoing process can be performed while the porosity is being maintained. When the substitution ratio of fluorine (F) of the fluorine polymer for another atom, such as hydrogen (H) and chlorine (Cl), is adjusted by change in contact time between fluorocarbon resin and fluorine gas, the hydrophobicity can be controlled. Although fluorocarbon polymer has somewhat hydrophobicity, the process for furthermore fluorination of the fluoro carbon polymer as described above enables higher hydrophobicity to be obtained.

EXAMPLES

Examples of the present invention will now be described.

Example 1

Paste of a catalyst layer composed of platinum supported on carbon (10V30E: 30 wt % Pt supported on Valcan XC-72 manufactured by Tanaka Kikinzoku) and solid polymer electrolyte solution (5 wt % Nafion solution manufactured by Ardrich) was applied to the surface of a porous carbon paper (0.5 mm) as an electro-conductive porous substrate to form the film of the paste. Then, the paste was dried at 120° C. for one hour in a nitrogen atmosphere. Thus, a conventional electrode was obtained. The electrode was impregnated with PVdF/NMP solution (the concentration of PVdF: 15 wt %) in a vacuum, and then immersed in water for 10 minutes. Thus, electrode A for a fuel cell was obtained.

The electrode A has a structure that the porous PVdF is provided for the inside portions of pores and the surface of the catalyst layer, inside of the electro-conductive porous substrate.

The amount of the platinum supported on carbon in the paste was adjusted when the paste was prepared so that the amount of platinum loading of the electrode A was about 1.0 mg/cm$^2$.

Then, the electrode A was hot-pressed to both sides of an ion-exchange membrane (Nafion manufactured by Dupont and having a thickness of 50 μm) at 140° C. Then, this membrane-electrode assembly was introduced into a single fuel cell holder so that cell A was obtained.

Example 2

Paste comprising platinum supported on carbon (10V30E: 30 wt % Pt supported on Valcan XC-72 manufactured by Tanaka Kikinzoku) and solid polymer electrolyte solution (5 wt % Nafion solution manufactured by Ardrich) was applied onto a polymer film (PFA) as a blank to form the film of the paste. Then, the paste was naturally dried for about one hour so that a catalyst layer was formed. The catalyst layer was hot-pressed to both sides of an ion-exchange membrane (Nafion manufactured by Dupont and having a thickness of 50 μm) at 140° C., and then the blank was removed away. Thus, a membrane-catalyst layer assembly was manufactured. Then, the surface of the catalyst layer of the assembly was coated with PVdF/MMP solution (the concentration of PVdF: 15 wt %) by using a brush. Then, the assembly was immersed in water for 10 minutes so that a membrane-catalyst layer assembly B was manufactured.

The assembly B has a structure in which the porous PVdF polymer is provided mainly for the surface of the catalyst layer.

The amount of the platinum supported on carbon in the paste was adjusted when the paste was prepared so that the amount of platinum loading in either side of the assembly B was about 1.0 mg/cm$^2$.

A porous carbon papers (0.5 mm), which served as a gas diffusion layer and to which hydrophobicity was imparted, were hot-pressed to the surface of the each catalyst layer.

Then, the assembly was introduced into e fuel cell holder so that cell B was manufactured.

Comparative Example 1

Paste comprising platinum supported on carbon (10V30E: 30 wt % Pt supported on Valcan XC-72 manufactured by Tanaka Kikinzoku), solid polymer electrolyte solution (5 wt % Nafion solution manufactured by Ardrich) and PTFE suspension (Teflon 30J manufactured by Mitsui-Dupont Fluorochemical) was applied onto a hydrophobic porous paper (0.5 mm) as an electro-conductive porous substrate to form a film of the paste. Then, the paste was dried for about one hour at 120° C. in a nitrogen atmosphere so that electrode C for a fuel cell was obtained.

The amount of the platinum supported on carbon in the paste was adjusted when the paste was prepared so that the amount of platinum loading in the electrode C was about 1.0 mg/cm$^2$.

Then, the electrode C was hot-pressed to both sides of an ion-exchange membrane (Nafion manufactured by Dupont and having a thickness of 50 μm) at 140° C. Then, the membrane-electrode assembly was introduced into a single fuel cell holder so that cell C was manufactured.

Comparative Example 2

Paste comprising of platinum supported on carbon (10V30E: 30 wt % Pt supported on Valcan XC-72 manufactured by Tanaka Kikinzoku), solid polymer electrolyte solution (5 wt % Nafion solution manufactured by Ardrich) and PTFE suspension (Teflon 30J manufactured by Mitsui-Dupont Fluorochemical) was applied onto a polymer film (PFA) as a blank to form the film of the paste. Then, the paste was naturally dried for about one hour so that a catalyst layer was manufactured. Then, the catalyst layer was hot-pressed to both sides of an ion-exchange membrane (Nafion manufactured by Dupont and having a thickness of 50 μm) at 140° C. and then the blank was removed away so that membrane-catalyst layer a assembly D was manufactured. The amount of the platinum in the paste was adjusted when the paste was prepared so that the amount of platinum in both sides of assembly D was about 1.0 mg/cm$^2$.

A porous carbon paper (0.5 mm) which served as a gas diffusion layer, to which hydrophobicity was imparted, was hot-pressed to the surface of each of the catalyst layer on the ion-exchange membrane. The assembly was introduced into a single fuel cell holder so that cell D was manufactured.

Figure 1:
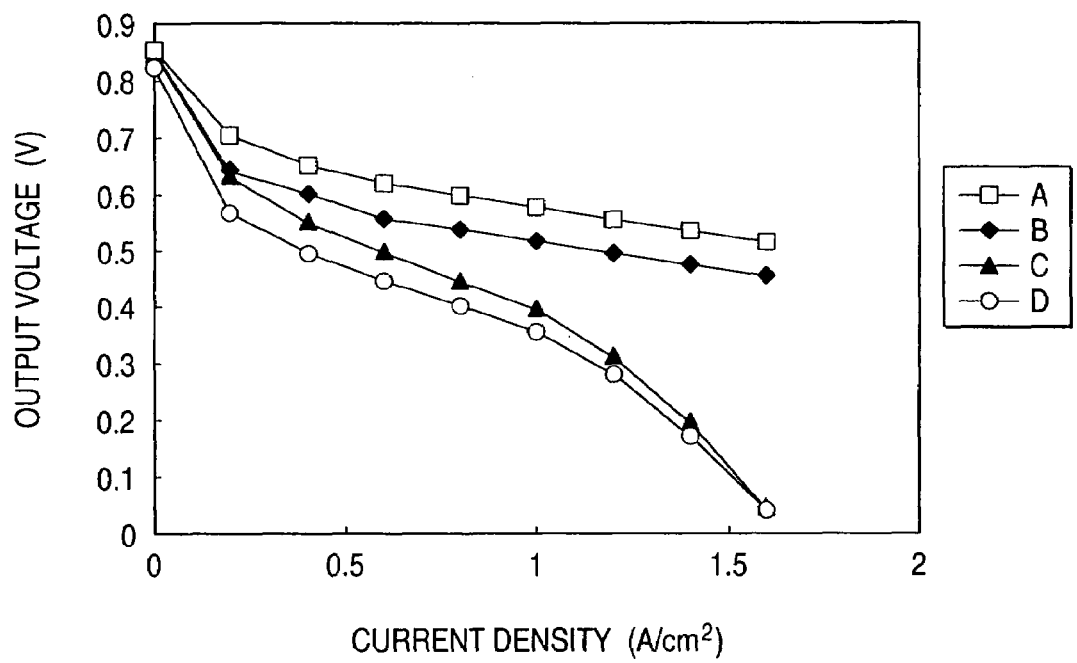
FIG. 1 is a graph showing I-V characteristics of cells A to D.

I-V characteristics for those cells on $H_2/O_2$ are shown in FIG. 1. The operation conditions were such that the pressure of supplied reactant gases was 2 atm. Moreover, humidification of gases was carried out by bubbling in a closed water tank at 80° C. Each cell was operated at 75° C. Each current level was maintained for 5 minutes during the Measurement.

As can be understood from FIG. 1, the cells (A and B) according to the present invention exhibited higher output voltages at each current density as compared with the conventional cells C and D. In particular, the cell A structured such that porous PVdF was provided for the inside of the pores in the catalyst layer and the surface of the same exhibited an output higher than that of the cell B. Since the electrode according to the present invention has the structure that the porous PVdF exhibiting high hydrophobicity was provided for the inside portions of the pores in the catalyst layer and/or the surface of the same, supply of hydrogen and oxygen as reactants to the deep portions of the electrode was enabled. Therefore, an active area of the catalyst layer was larger than that of the conventional catalyst layer. In particular, the cell A' having the structure that porous PVdF was provided for the inside portions of the pores of the catalyst layer the surface of the same and inside of the carbon paper as the substrate, exhibited excellent characteristics.

Example 3

A porous carbon substrate (the thickness was 0.5 mm, an average fiber diameter was 10 μm, an average diameter of pores was 10 μm and the porosity was 75%) was, in a vacuum, impregnated with PVdF/NMP solution (concentration of PVdF was 20 wt %). Then, the substrate was immersed in water for 10 minutes so that the porous carbon substrate including the porous PVdF was manufactured.

Then, paste comprising platinum supported on carbon (10V30E: 30 wt % Pt supported on Valcan XC-72 manufactured by Tanaka Kikinzoku), solid polymer electrolyte solution (5 wt % Nafion solution manufactured by Ardrich) and PTFE suspension (Teflon 30J manufactured by Mitsui-Dupont Fluorochemical) was applied onto the surface of the above-mentioned porous carbon substrate by a spraying method so that electrode E for a fuel cell was manufactured.

The amount of the platinum supported on carbon in the paste was adjusted when the paste was prepared so that the amount of platinum in the electrode E was about 1.0 mg/cm$^2$.

The electrode E was hot-pressed to both sides of an ion-exchange membrane (Nation manufactured by Dupont and having a thickness of 50 μm) at 140° C. This membrane-electrode assembly was introduced into a single fuel cell holder so that cell E was manufactured.

Example 4

A porous carbon paper as a substrate (the thickness was 0.5 mm, an average fiber diameter was 10 μm, an average diameter of pores was 10 μm and the porosity was 75%) was impregnated with P(VdF-HFP)/MEK solution (the concentration of PVdF-HFP was 10 wt %) at 75° C. Then, the substrate including P(VdF-HFP)/MEK solution was dry in thermostatic oven at 30° C. so that MEK was removed. Thus, the porous carbon substrate including the porous P(VdF-HFP) was manufactured by the phase inversion process.

Then, paste composed of platinum supported on carbon (10V30E: 30 wt % Pt supported on Valcan XC-72 manufactured by Tanaka Kikinzoku), solid polymer electrolyte solution (5 wt % Nafion solution manufactured by Ardrich) and PTFE suspension (Teflon 30J manufactured by Mitsui-Dupont Fluorochemical) was applied to the above-mentioned carbon substrate by a spraying method so that electrode F for a fuel cell was manufactured.

The amount of the platinum loading in the electrode was adjusted when the paste was prepared so that the amount of platinum loading in the electrode F was about 1.0 mg/cm$^2$.

The electrode F was hot-pressed to both sides of an ion-exchange membrane (Nafion manufactured by Dupont and having a thickness of 50 μm). This membrane-electrode assembly was introduced into a single fuel cell holder so that cell F was manufactured.

Comparative Example 3

A porous carbon substrate (the thickness was 0.5 mm, an average fiber diameter was 10 μm, an average diameter of pores was 10 μm and the porosity was 75%), to which hydrophobicity was imparted with PTFE suspension, was applied with paste comprising platinum supported on carbon (10V30E: 30 wt % Pt supported on Valcan XC-72 manufactured by Tanaka Kikinzoku), solid polymer electrolyte solution (5 wt % Nafion solution manufactured by Ardrich) and PTFE suspension (Teflon 30J manufactured by Mitsui-Dupont Fluorochemical) by a spraying method so that electrode F for a fuel cell was manufactured.

The amount of the platinum supported on carbon in the paste was adjusted when the paste was prepared so that the amount of platinum in the electrode F was about 1.0 mg/cm$^2$.

The electrode F was hot-pressed onto both sides of an ion-exchange membrane (Nafion manufactured by Dupont and having a thickness of 50 μm) at 140° C. The membrane-electrode assembly was introduced into a single fuel cell holder so that cell G was manufactured.

I-V characteristics of the cells (E, F and G) on $H_2/O_2$ were measured. The I-V characteristics for the cell (E) and cell (G) were shown in FIG. 2. Note that the I-V characteristics of the cell (F) according to the present invention were similar to those of the cell (E) according to the present invention. The operation conditions were such that the pressure of supplied gases were 1.8 atm. Moreover, humidification of gases was carried out by bubbling in a closed water tank at 85° C. to perform wetting. Each cell was operated at 78° C. Each current level was maintained for 5 minutes during the measurement.

Figure 2:
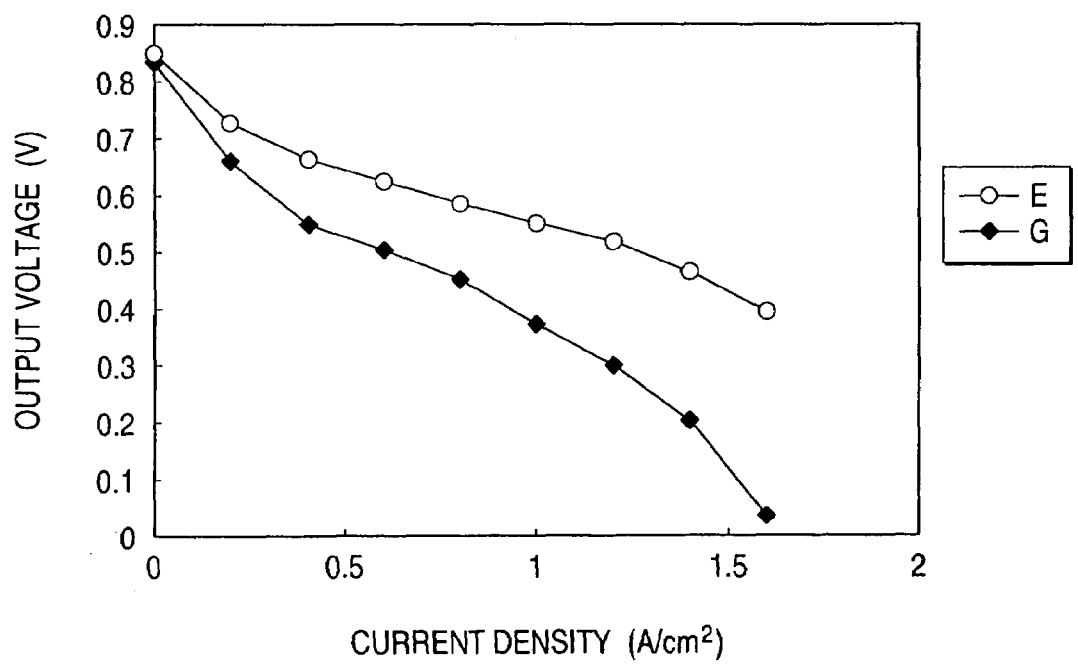
FIG. 2 is a graph showing I-V characteristics of cells E and G.

As can be understood from FIG. 2, the cells (E and F) according to the present invention exhibited higher output voltage at each current density as compared with the conventional cell (G). Since the conventional electrode had the structure that the thickness of the catalyst layer was uniform, so ineffective portions were distributed in the catalyst layer. On the other hand, each of the electrodes according to the present invention had the structure that the thickness of each of the catalyst layer of the electrode was controlled to be constant (5 μm to 10 μm). Therefore, the overall portion of the catalyst layer acted effectively so that the electrochemically active area of the catalyst layer of the electrode was larger than that of the conventional catalyst layer of the electrode.

Example 5

A porous carbon paper as a substrate (the thickness was 0.5 mm, an average fiber diameter was 10 μm, an average diameter of pores was 10 μm and the porosity was 75%) was, in vacuum, impregnated with 20 wt % P(VdF-HFP)(HFP: 6 wt %)/NMP solution. Then, the substrate including P(VdF-HFP)/NMP solution was immersed in water for 10 minutes so that a porous carbon substrate including the porous P(VdF-HFP) was obtained. Then, the porous carbon substrate was exposed to a mixed-gas atmosphere in which 10% fluorine gas –90% nitrogen gas for 20 minutes. Thus, carbon substrate including a porous carbon substrate including the fluorinated porous fluorocarbon polymer P(VdF-HFP) was manufactured. Then, paste composed of platinum supported on carbon (10V30E: 30 wt % Pt supported on Valcan XC-72 manufactured by Tanaka Kikinzoku), solid polymer electrolyte solution (5 wt % Nafion solution manufactured by Ardrich) and PTFE suspension (Teflon 30J manufactured by Mitsui-Dupont Fluorochemical) was applied onto the porous carbon substrate to form the film of the paste so that electrode H for a fuel cell was manufactured. The amount of the platinum supported on carbon was adjusted when the paste was prepared so that the amount of platinum loading in the electrode H was about 1.0 mg/cm$^2$.

The electrode H was hot-pressed onto both sides of an ion-exchange membrane (Nafion manufactured by Dupont and having a thickness of 50 μm) at 140° C. This membrane-electrode assembly was introduced into a single fuel cell holder so that cell H was manufactured.

Comparative Example 4

A porous carbon paper as a substrate (0.5 mm) to which hydrophobicity was imparted by coating with PTFE suspension (Teflon 30J manufactured by Mitsui-Dupont Fluorochemical) was coated with paste including platinum supported on carbon (10V30E: 30 wt % Pt supported on Valcan XC-72 manufactured by Tanaka Kikinzoku), solid polymer electrolyte solution (5 wt % Nafion solution manufactured by Ardrich) and PTFE suspension (Teflon 30J manufactured by Mitsui-Dupont Fluorochemical) so that electrode I for a fuel cell was manufactured. The amount of the platinum supported on carbon was adjusted when the paste was prepared so that the amount of platinum loading in the electrode I was about 1.0 mg/cm$^2$. Then, the electrode I was hot-pressed onto both sides of an ion-exchange membrane (Nafion manufactured by Dupont and having a thickness of 50 μm) at 140° C. This membrane-electrode assembly was introduced into a single fuel cell holder so that cell I was manufactured.

Figure 3:
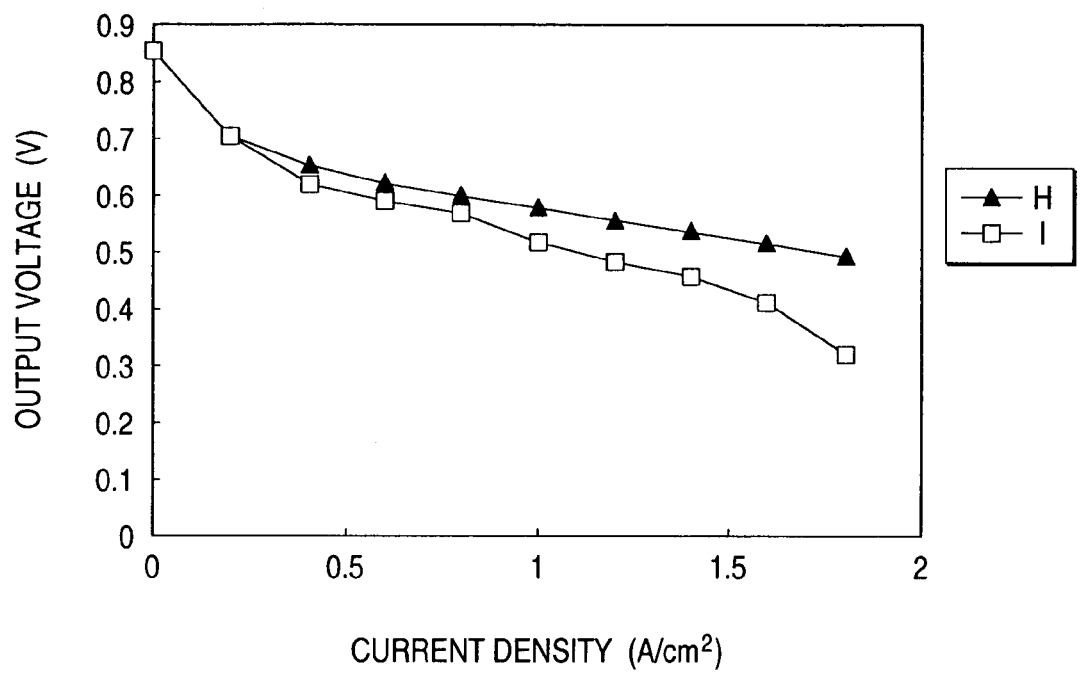
FIG. 3 is a graph showing I-V characteristics of cells H and I.

I-V characteristics of the cells (H and I) on $H_2/O_2$ were shown in FIG. 3. The operation conditions were such that the pressure of supplied reactant gases was 3 atm. Moreover, humidification of gases was carried out by bubbling in a closed water tank at 80° C. Each cell was operated at 60° C. Each current level was maintained for 10 minutes during the measurement.

As can be understood from FIG. 3, the cell (H) according to the present invention exhibited output voltages higher than those of the conventional cell (I) in a high current density region. The electrode according to the present invention comprised the porous carbon substrate contains porous polymers obtained by fluorinating P(VdF-HFP). Therefore, excellent hydrophobicity and gas diffusivity were simultaneously imparted to the electrode. On the other hand, the conventional electrode comprised the porous carbon substrate coated with PTFE particles. Therefore, the conventional electrode having excellent hydrophobicity and poor gas diffusivity because the pores in the substrate were closed by PTFE particles.

The electrode for a fuel cell according to the present invention including the porous polymer shows simultaneously excellent hydrophobicity and gas diffusivity. Furthermore, the thickness of the catalyst layer was maintained uniformly, therefore overall portion of the electrode is effective for electrochemical reactions. Hence it follows that the active area of the electrode can be enlarged as compared with that of the conventional electrode. As a result, a performance fuel cell can be manufactured. The manufacturing method according to the present invention is able to manufacture the electrode improving a high-performance for fuel cell can be manufactured.

What is claimed is:
1. An electrode for a fuel cell, comprising:
   a catalyst layer comprising a solid polymer electrolyte, catalyst particles, and first pores; and
   a polymer having numerous second pores therein,
   wherein said polymer does not substantially have an ion-exchange function, and said polymer exists either (i) in a portion of said first pores of said catalyst layer or (ii) both in a portion of said first pores of said catalyst layer and on a surface of said catalyst layer.

2. The electrode according to claim 1, wherein said polymer comprises fluorocarbon polymer.

3. The electrode according to claim 2, wherein said polymer does not substantially contain anything except its polymer material.

4. The electrode according to claim 3, wherein said numerous second pores are obtained by a phase inversion process.

5. The electrode according to claim 3, wherein said numerous second pores are substantially formed by only said polymer.

6. The electrode according to claim 2, wherein said numerous second pores are obtained by a phase inversion process.

7. The electrode according to claim 2, wherein said numerous second pores are substantially formed by only said polymer.

8. The electrode according to claim 1, wherein said polymer comprises polyvinylidene fluoride.

9. The electrode according to claim 8, wherein said polymer does not substantially contain anything except its polymer material.

10. The electrode according to claim 9, wherein said numerous second pores are obtained by a phase inversion process.

11. The electrode according to claim 8, wherein said numerous second pores are obtained by a phase inversion process.

12. The electrode according to claim 8, wherein said numerous second pores are substantially formed by only said polymer.

13. The electrode according to claim 1, wherein said polymer does not substantially contain anything except its polymer material.

14. The electrode according to claim 13, wherein said numerous second pores are obtained by a phase inversion process.

15. The electrode according to claim 13, wherein said numerous second pores are substantially formed by only said polymer.

16. The electrode according to claim 1, wherein said numerous second pores are obtained by a phase inversion process.

17. The electrode according to claim 16, wherein said numerous second pores are substantially formed by only said polymer.

18. An electrode for a fuel cell, comprising:
a catalyst layer comprising a solid polymer electrolyte, catalyst particles, and first pores;
a gas diffusion layer; and
a polymer having numerous second pores therein,
wherein said gas diffusion layer contains an electro-conductive porous substrate,
said polymer does not substantially have an ion-exchange function, and
said polymer exists either (i) in a portion of said first pores of said catalyst layer or (ii) both in a portion of said first pores of said catalyst layer and in an inside portion of said substrate.

19. The electrode according to claim 18, wherein said polymer comprises fluorocarbon polymer.

20. The electrode according to claim 19, wherein said polymer does not substantially contain anything except its polymer material.

21. The electrode according to claim 20, wherein said numerous second pores are obtained by a phase inversion process.

22. The electrode according to claim 20, wherein said numerous second pores are substantially formed by only said polymer.

23. The electrode according to claim 19, wherein said numerous second pores are obtained by a phase inversion process.

24. The electrode according to claim 19, wherein said numerous second pores are substantially formed by only said polymer.

25. The electrode according to claim 18, wherein said polymer comprises polyvinylidene fluoride.

26. The electrode according to claim 25, wherein said polymer does not substantially contain anything except its polymer material.

27. The electrode according to claim 26, wherein said numerous second pores are obtained by a phase inversion process.

28. The electrode according to claim 25, wherein said numerous second pores are obtained by a phase inversion process.

29. The electrode according to claim 25, wherein said numerous second pores are substantially formed by only said polymer.

30. The electrode according to claim 18, wherein said polymer does not substantially contain anything except its polymer material.

31. The electrode according to claim 30, wherein said numerous second pores are obtained by a phase inversion process.

32. The electrode according to claim 30, wherein said numerous second pores are substantially formed by only said polymer.

33. The electrode according to claim 18, wherein said numerous second pores are obtained by a phase inversion process.

34. The electrode according to claim 18, wherein said numerous second pores are substantially formed by only said polymer.

* * * * *